(12) United States Patent
Takatsu

(10) Patent No.: US 12,094,094 B2
(45) Date of Patent: Sep. 17, 2024

(54) WORKPIECE PHOTOGRAPHED IMAGE PROCESSING DEVICE, WORKPIECE PHOTOGRAPHED IMAGE PROCESSING METHOD, AND PROCESSING SYSTEM

(71) Applicant: AMADA CO., LTD., Kanagawa (JP)

(72) Inventor: Satoshi Takatsu, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 368 days.

(21) Appl. No.: 17/769,729

(22) PCT Filed: Oct. 14, 2020

(86) PCT No.: PCT/JP2020/038767
§ 371 (c)(1),
(2) Date: Apr. 16, 2022

(87) PCT Pub. No.: WO2021/079802
PCT Pub. Date: Apr. 29, 2021

(65) Prior Publication Data
US 2022/0414843 A1 Dec. 29, 2022

(30) Foreign Application Priority Data
Oct. 21, 2019 (JP) ................................. 2019-191675

(51) Int. Cl.
*G06T 5/80* (2024.01)
*B25J 9/16* (2006.01)
(Continued)

(52) U.S. Cl.
CPC .............. *G06T 5/80* (2024.01); *B25J 9/1697* (2013.01); *B25J 13/08* (2013.01); *G06T 7/73* (2017.01);
(Continued)

(58) Field of Classification Search
CPC ... G06T 5/80; G06T 7/73; G06T 2207/30164; G06T 2207/30204; G06T 2207/30208; B25J 9/1697; B25J 13/08
See application file for complete search history.

(56) References Cited

U.S. PATENT DOCUMENTS

2003/0043303 A1* 3/2003 Karuta ..................... H04N 5/74
348/744
2008/0218811 A1* 9/2008 Yeo ....................... H04N 9/3185
358/461
(Continued)

FOREIGN PATENT DOCUMENTS

| JP | 2015-35685 A | 2/2015 |
|---|---|---|
| JP | 2018-120388 A | 8/2018 |
| WO | 2019/049331 A1 | 3/2019 |

OTHER PUBLICATIONS

International Search Report for corresponding Application No. PCT/JP2020/038767, mailed Dec. 22, 2020.
(Continued)

*Primary Examiner* — Carol Wang
(74) *Attorney, Agent, or Firm* — Renner, Otto, Boisselle & Sklar, LLP

(57) ABSTRACT

A camera is located at a position deviated from directly above a center of a placement location of a workpiece. When a photographed image is generated by photographing, with the camera, the placement location at which the workpiece is placed, an image processing device specifies, by using a preliminarily determined conversion parameter, to which pixels in the photographed image two-dimensional coordinates within a photographed three-dimensional space correspond, aligns the specified pixels corresponding to the respective coordinates in a two-dimensional manner, and generates a corrected photographed image in which a trapezoidal distortion in the photographed image is corrected. A
(Continued)

robot control device detects a position of the workpiece at the placement location based on the corrected photographed image, and controls a workpiece retention robot so as to retain the workpiece and transport the workpiece to a processing machine.

6 Claims, 15 Drawing Sheets

(51) Int. Cl.
  *B25J 13/08* (2006.01)
  *G06T 7/73* (2017.01)
(52) U.S. Cl.
  CPC .............. *G06T 2207/30164* (2013.01); *G06T 2207/30204* (2013.01)

(56) References Cited

U.S. PATENT DOCUMENTS

2016/0203606 A1    7/2016   Arata
2020/0273205 A1    8/2020   Yamashita

OTHER PUBLICATIONS

Written Opinion for corresponding Application No. PCT/JP2020/038767, mailed Dec. 22, 2020.
Extended European Search Report for corresponding EP Application No. 20879458.6 dated Feb. 10, 2023.

* cited by examiner

Fig. 18
(a)
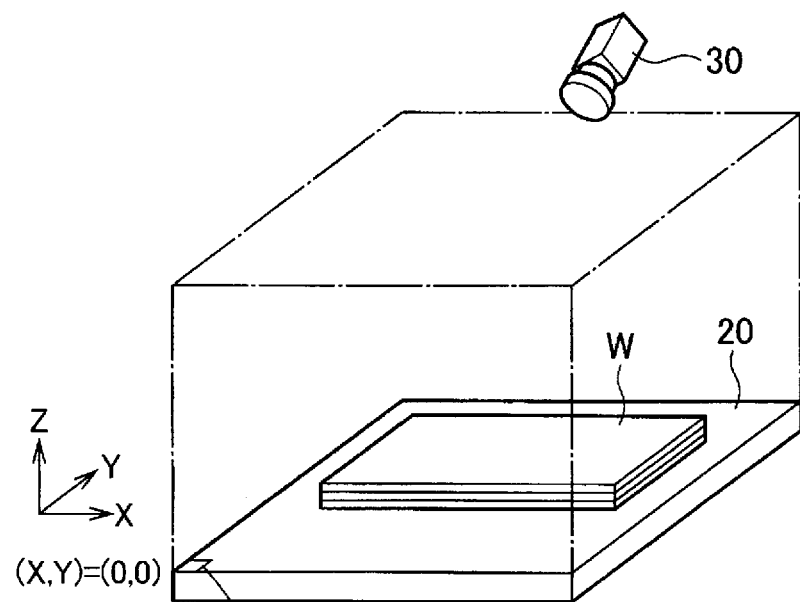
(b)
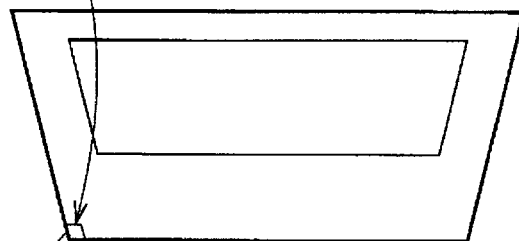
(c)
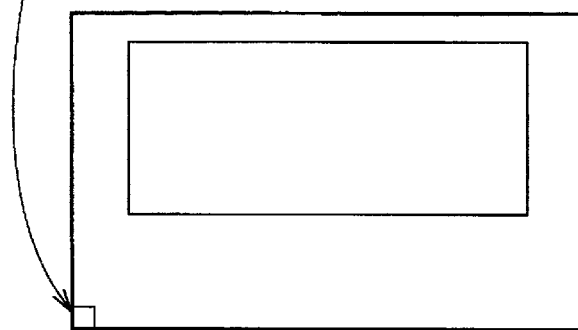

WORKPIECE PHOTOGRAPHED IMAGE PROCESSING DEVICE, WORKPIECE PHOTOGRAPHED IMAGE PROCESSING METHOD, AND PROCESSING SYSTEM

TECHNICAL FIELD

The present disclosure relates to a workpiece photographed image processing device, a workpiece photographed image processing method, and a processing system.

BACKGROUND ART

A workpiece retention robot may retain a workpiece placed at a placement location such as a pallet and transport the workpiece to a processing machine such as a press brake (see Patent Literature 1). An image processing device detects, based on a photographed image photographed by a camera, the position of the workpiece of the workpiece placed at the placement location.

CITATION LIST

Patent Literature

Patent Literature 1: Japanese Patent Application Laid-Open Publication No. 2018-120388

SUMMARY

The workpiece needs to be photographed by the camera from directly above the workpiece so that the shape of the workpiece is properly photographed. However, if the camera is located directly above the workpiece, the workpiece, a crane, or a workpiece retention robot may interfere with the camera when the crane places the workpiece to the placement location or the workpiece retention robot transports the workpiece. For this reason, it is necessary to retract the camera. Therefore, interference can be avoided if the camera is located at a position away from the workpiece retention robot deviated from directly above the center of the placement location.

However, if the camera is located at a position deviated from the center of the placement location, the workpiece is photographed from an oblique direction. As a result, the shape of the workpiece is not properly photographed. For example, if the workpiece is rectangular, the workpiece is be photographed in a trapezoidal shape. If the photographed workpiece does not properly represent the shape of the workpiece, the position of the workpiece placed at the placement location cannot be correctly recognized, and the workpiece retention robot may not be able to retain the workpiece. Therefore, it is necessary to correct, to an appropriate shape, the workpiece photographed image obtained by photographing the workpiece with a camera located at a position deviated from directly above the center of the placement location.

It is an object of one or more embodiments to provide a workpiece photographed image processing device and a workpiece photographed image processing method capable of correcting distortion in a trapezoidal shape of the workpiece photographed image obtained by photographing the workpiece with a camera located at a position deviated from directly above the center of the placement location. Further, it is an object of one or more embodiments to provide a processing system capable of retaining a workpiece by detecting a position of the workpiece based on the workpiece photographed image in which the distortion in a trapezoidal shape is corrected.

According to a first aspect of one or more embodiments, there is provided a workpiece photographed image processing device that includes a first conversion parameter calculation unit configured to calculate, based on a first photographed image obtained by photographing a lattice pattern with a camera located at a position deviated from directly above a center of a placement location of a workpiece, a first conversion parameter for correcting an image distortion due to a lens of the camera, a lens distortion correction unit configured to correct, by using the first conversion parameter, the image distortion due to the lens included in a second photographed image obtained by photographing a jig board with the camera, a second conversion parameter calculation unit configured to extract a plurality of first reference points of the jig board within the second photographed image in which the image distortion is corrected by the lens distortion correction unit, and to calculate, based on the actual first reference points of the jig board and the extracted first reference points within the second photographed image, a second parameter for converting two-dimensional coordinates within a three-dimensional space photographed by the camera into positions of pixels within the second photographed image, a third conversion parameter calculation unit configured to extract, by using the second parameter, a region corresponding to an actual predetermined region of the jig board within the second photographed image in which the image distortion is corrected by the lens distortion correction unit, to extract a plurality of second reference points based on an image of the extracted region within the second photographed image, to add, by using the first conversion parameter, the image distortion due to the lens to the second reference points, and to calculate, based on the actual second reference points of the jig board and the second reference points within the second photographed image to which the image distortion due to the lens is added, a third conversion parameter for converting the two-dimensional coordinates within the three-dimensional space into the positions of the pixels within the second photographed image, and a trapezoidal distortion correction unit configured to specify, by using the third conversion parameter, to which pixels in the third photographed image the two-dimensional coordinates within the three-dimensional space photographed by the camera correspond when a third photographed image is generated by photographing, with the camera, the placement location at which the workpiece is placed, to align the specified pixels corresponding to the respective coordinates in a two-dimensional manner, and to generate a fourth photographed image in which a trapezoidal distortion in the third photographed image is corrected.

According to a second aspect of one or more embodiments, a workpiece photographed image processing method is provided that includes calculating, based on a first photographed image obtained by photographing a lattice pattern with a camera located at a position deviated from directly above a center of a placement location of a workpiece, a first conversion parameter for correcting an image distortion due to a lens of the camera, correcting, by using the first conversion parameter, the image distortion due to the lens included in a second photographed image obtained by photographing a jig board with the camera, extracting a plurality of first reference points of the jig board within the second photographed image in which the image distortion is corrected, calculating, based on the actual first reference points of the jig board and the extracted first reference points within the second photographed image, a second parameter for converting two-dimensional coordinates within a three-dimensional space photographed by the camera into positions of pixels within the second photographed image, extracting, by using the second parameter, a region corresponding to an actual predetermined region of the jig board within the second photographed image in which the image distortion is corrected, extracting a plurality of second reference points based on an image of the extracted region within the second photographed image, adding, by using the first conversion parameter, the image distortion due to the lens to the second reference points, calculating, based on the actual second reference points of the jig board and the second reference points within the second photographed image to which the image distortion due to the lens is added, a third conversion parameter for converting the two-dimensional coordinates within the three-dimensional space into the positions of the pixels within the second photographed image, and specifying, by using the third conversion parameter, to which pixels in the third photographed image the two-dimensional coordinates within the three-dimensional space photographed by the camera correspond when a third photographed image is generated by photographing, with the camera, the placement location at which the workpiece is placed, aligning the specified pixels corresponding to the respective coordinates in a two-dimensional manner, and generating a fourth photographed image in which a trapezoidal distortion in the third photographed image is corrected.

According to a third aspect of one or more embodiments, a processing system is provided that includes a camera located at a position deviated from directly above a center of a placement location of a workpiece, an image processing device configured to specify, by using a preliminarily determined conversion parameter, to which pixels in a photographed image two-dimensional coordinates within a photographed three-dimensional space correspond when the photographed image is generated by photographing, with the camera, the placement location at which the workpiece is placed, to align the specified pixels corresponding to the respective coordinates in a two-dimensional manner, and to generate a corrected photographed image in which a trapezoidal distortion in the photographed image is corrected, and a robot control device configured to detect a position of the workpiece at the placement location based on the corrected photographed image, and to control a workpiece retention robot so as to retain the workpiece and transport the workpiece to a processing machine.

According to the workpiece photographed image processing device and the workpiece photographed image processing method of the one or more embodiments, it is possible to correct the trapezoidal distortion in the workpiece photographed image obtained by photographing the workpiece with the camera located at the position deviated from directly above the center of the placement location. According to the processing system of the one or more embodiments, it is possible to retain the workpiece by detecting the position of the workpiece based on the workpiece photographed image in which the trapezoidal distortion is corrected.

BRIEF DESCRIPTION OF DRAWINGS

FIG. 18 is a conceptual diagram showing the processing executed in step S7 of FIG. 3.

DESCRIPTION OF EMBODIMENT

Hereinafter, a workpiece photographed image processing device, a workpiece photographed image processing method, and a processing system of one or more embodiments will be described with reference to the attached drawings. First, with reference to FIGS. 1 and 2, a configuration example of the processing system will be described, in which workpieces are retained by a workpiece retention robot and transported to a processing machine so that the workpieces are processed.

Figure 1:
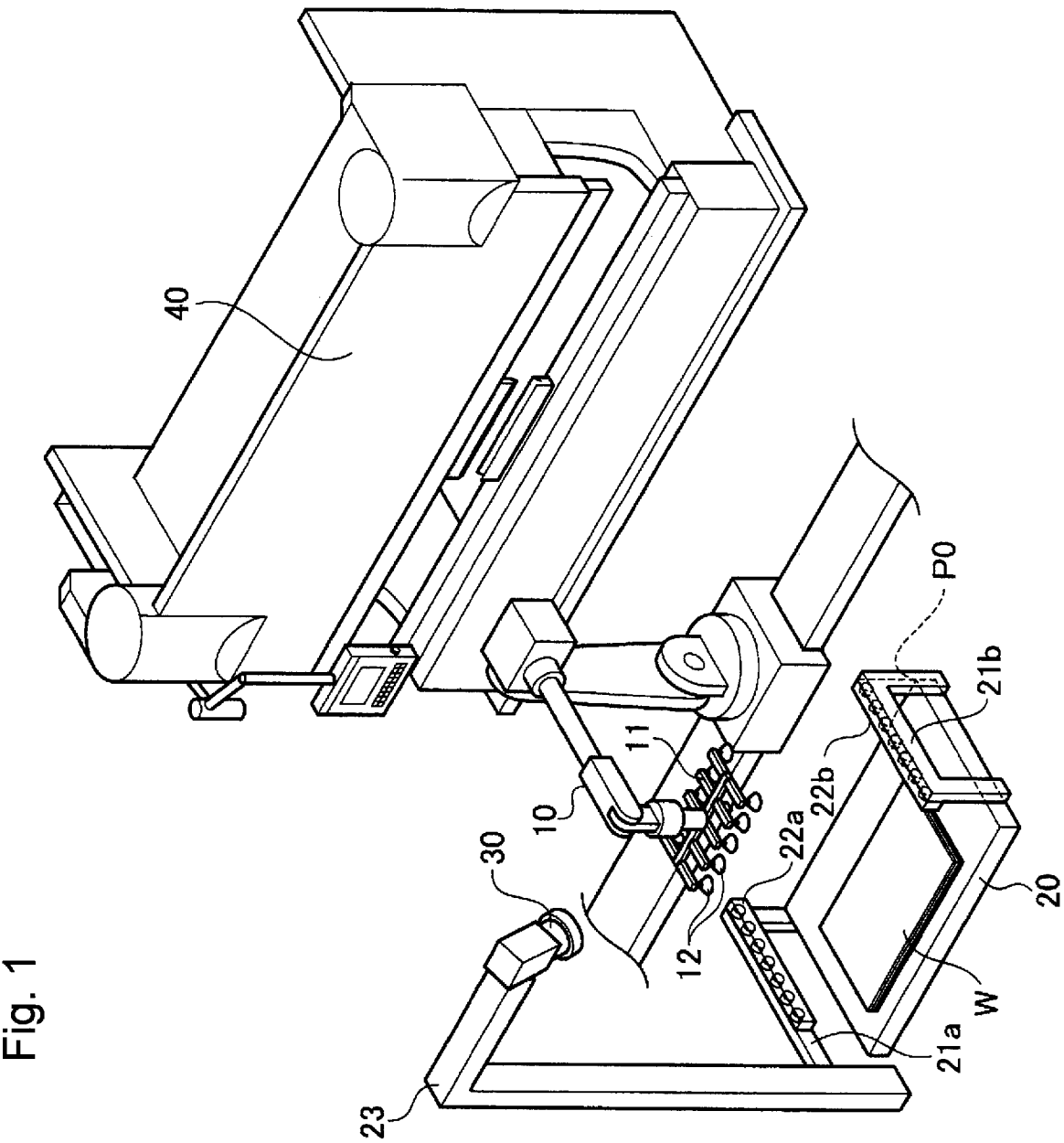
FIG. 1 is a perspective view showing a configuration example of a processing system in which workpieces placed at a placement location are retained by a workpiece retention robot to be transported to a processing machine so that the workpieces are processed.

In FIG. 1, workpieces W are placed on a pallet 20, which is an example of a placement location. Here, a plurality of workpieces W are loaded on the pallet 20. Frames 21a and 21b are arranged on both sides of the pallet 20. The frame 21a includes one vertical frame and a horizontal frame connected to the upper end portion of the vertical frame. The frame 21b includes a pair of vertical frames and a horizontal frame connected to the upper end portions of the pair of vertical frames.

Lighting fixtures 22a and 22b are attached to the opposing surfaces of the horizontal frames of the frames 21a and 21b, respectively. The lighting fixtures 22a and 22b include, for example, a plurality of light emitting diodes (LEDs). The lighting fixtures 22a and 22b irradiate the workpiece W placed on the pallet 20 with illumination beams.

An L-shaped support column 23 including a vertical frame extending to a predetermined height and a horizontal frame connected to the upper end portion of the vertical frame is attached to the frame 21a. A camera 30 is attached to the distal end of the support column 23 (the horizontal frame). The camera 30 is a so-called monocular camera. The camera 30 is located at a position deviated from directly above the center of the pallet 20 in a direction away from a workpiece retention robot 10 so as to photograph the pallet 20 and the workpiece W. In other words, the camera 30 photographs the pallet 20 and the workpiece W from an obliquely upper position. As a result, the camera 30 does not interfere with the operation of the workpiece retention robot 10 to retain and transport the workpiece W placed on the pallet 20.

It is preferable that the workpiece W is irradiated with the illumination beams by the lighting fixtures 22a and 22b when the camera 30 photographs the workpiece W placed on the pallet 20. When the workpiece W is irradiated with the illumination beams, the edge of the workpiece W is clarified. This makes it easier to detect the position of the workpiece W when the position of the workpiece W is detected by pattern matching.

The articulated workpiece retention robot 10 is arranged between the pallet 20 and a press brake 40, which is an example of the processing machine. The workpiece retention robot 10 includes a gripper 11 at the distal end thereof for sucking the workpiece W. The gripper 11 includes a plurality of suction pads 12. The gripper 11 sucks and retains one uppermost workpiece W, which is transported to the press brake 40 so that the workpiece is processed.

Figure 2:
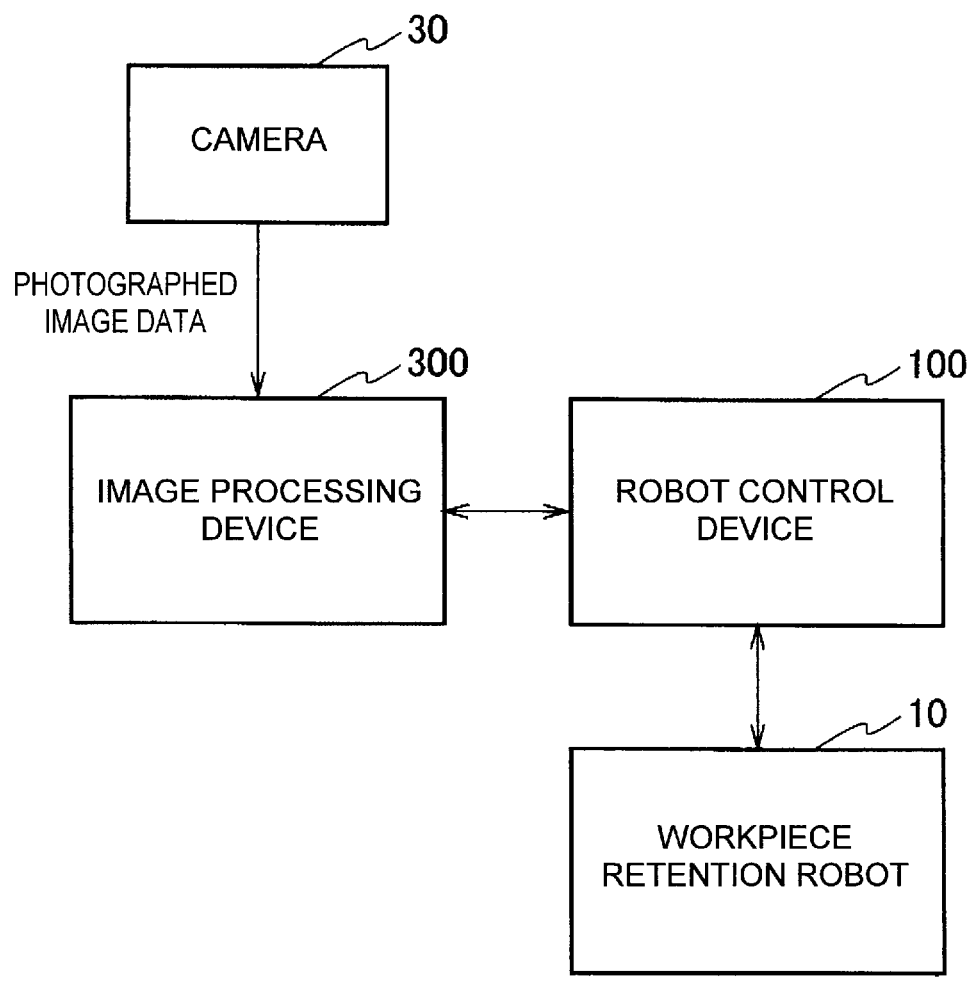
FIG. 2 is a block diagram showing a configuration example of the processing system including a workpiece photographed image processing device of one or more embodiments.

As shown in FIG. 2, photographed image data generated by the camera 30 is supplied to an image processing device 300. The image processing device 300 functions as a workpiece photographed image processing device of one or more embodiments. As described above, the camera 30 is located at the position deviated from directly above the center of the pallet 20 and photographs the workpiece W from the oblique direction. Therefore, the photographed image of the workpiece W is distorted in shape. The image processing device 300 corrects the photographed image into an appropriate shape, as will be described later. The image processing device 300 detects the position of the workpiece W based on the corrected photographed image, and supplies the detected position information to the robot control device 100.

The robot control device 100 controls the workpiece retention robot 10 so as to retain the workpiece W on the pallet 20 based on the position information of the workpiece W.

The image processing device 300 and the robot control device 100 can be configured with a computer device. By allowing the robot control device 100 to have the function of the image processing device 300, the robot control device 100 and the image processing device 300 may be integrated.

Figure 3:
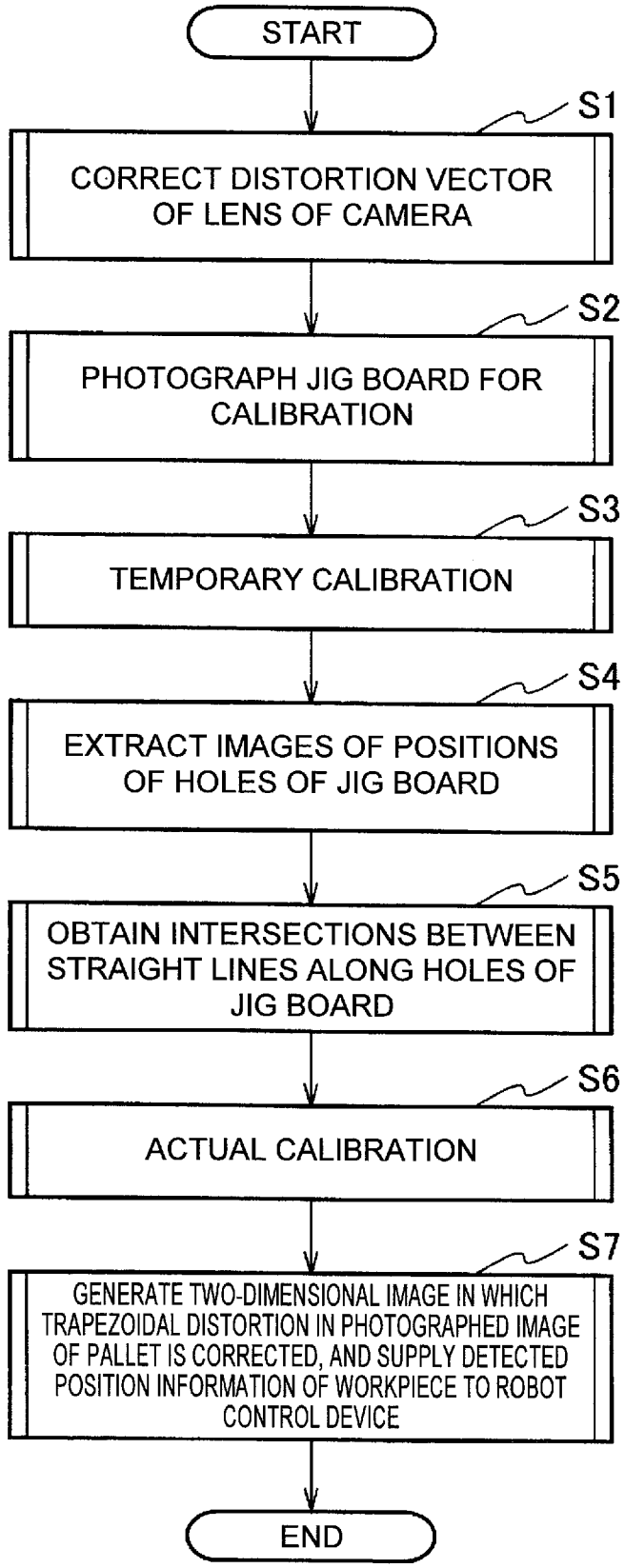
FIG. 3 is a flowchart showing an overall operation of the workpiece photographed image processing device of one or more embodiments, and overall processing by a workpiece photographed image processing method of one or more embodiments.

The image processing device 300 executes processing shown in the flowchart of FIG. 3 to correct the photographed image. In step S1, the image processing device 300 corrects a distortion vector of a lens of the camera 30. In step S2, the image processing device 300 photographs a jig board for calibration, and executes temporary calibration in step S3. In step S4, the image processing device 300 extracts images of the positions of holes of the jig board, and obtains intersections between straight lines along the holes of the jig board in step S5. In step S6, the image processing device 300 executes the actual calibration. As will be described later, by the processing of steps S1 to S6, conversion parameters are generated for generating a two-dimensional image in which a trapezoidal distortion photographed by the camera 30 is corrected.

When the camera 30 photographs the pallet 20 in order to detect the position of the workpiece W placed on the pallet 20, in step S7, the image processing device 300 generates the two-dimensional image in which the trapezoidal distortion is corrected and supplies the detected position information of the workpiece W to the robot control device 100.

Figure 4:
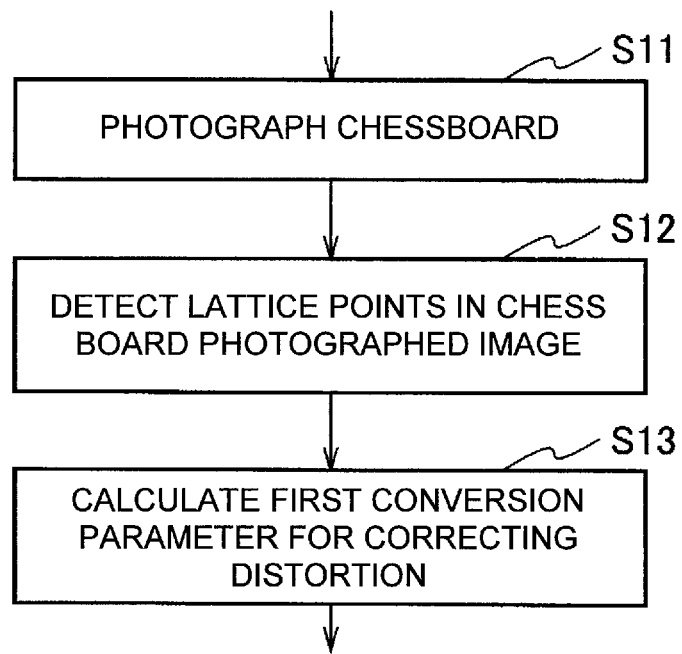
FIG. 4 is a flowchart showing specific processing of step S1 of FIG. 3.
Figure 5:
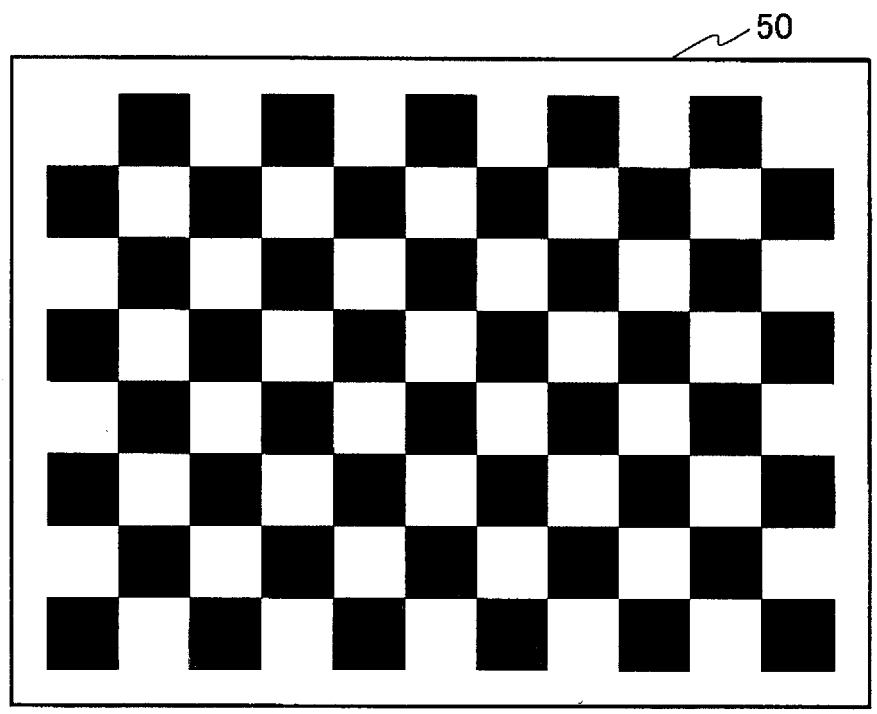
FIG. 5 is a plan view showing an example of a chess board used in step S1 of FIG. 3.
Figure 6:
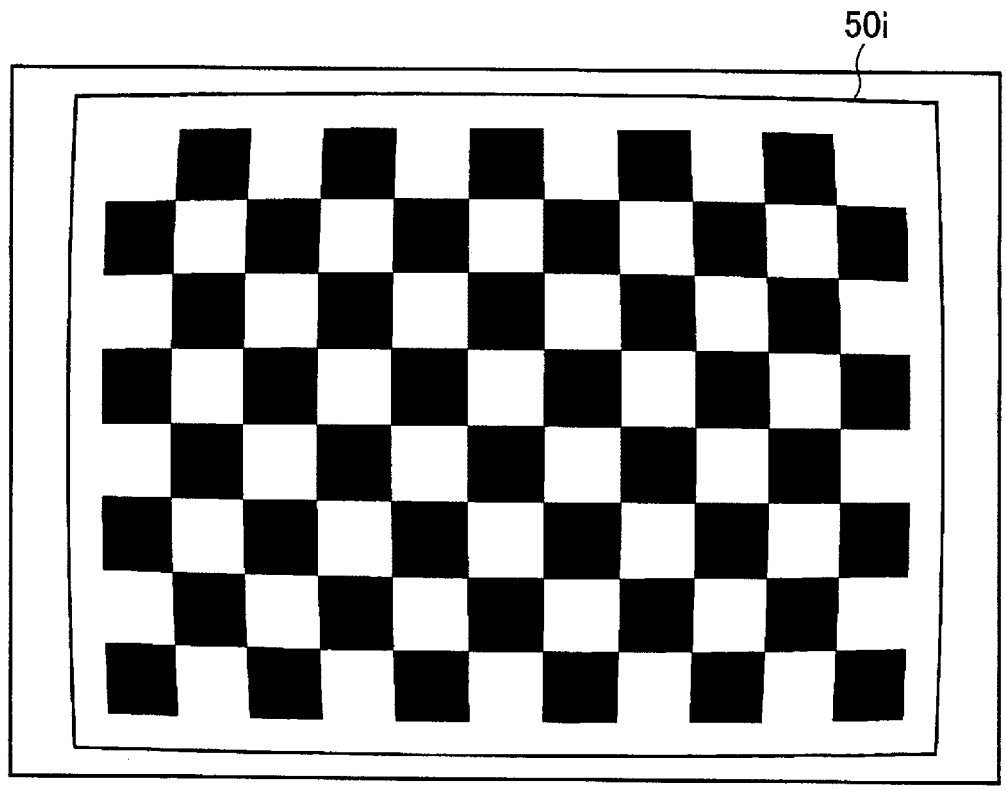
FIG. 6 is a diagram showing a chess board photographed image obtained by photographing, with a camera, the chess board shown in FIG. 5.

Hereinafter, the processing of steps S1 to S7 will be specifically described. FIG. 4 shows specific processing of step S1. In step S11 of FIG. 4, the camera 30 photographs a chess board 50 as shown in FIG. 5. In the chess board 50, white squares and black squares are arranged alternately in two orthogonal directions. The chess board 50 is an example of a lattice pattern, but any graphic pattern may be used. When the camera 30 photographs the chess board 50, a chess board photographed image 50i (a first photographed image) as shown in FIG. 6 is obtained. The chess board photographed image 50i is input to the image processing device 300. The image processing device 300 detects grid points of the chess board photographed image 50i in step S12.

It is preferable that the camera 30 photographs the chess board 50 a plurality of times in step S11 and supplies a plurality of the chess board photographed images 50i to the image processing device 300. At this time, the camera 30 may photograph the chess board 50 at a plurality of angles. The chess board 50 may be photographed such that the chess board photographed image 50i is not distorted into a trapezoidal shape. Alternately, the chess board 50 may be photographed such that the chess board photographed image 50i is distorted into a trapezoidal shape. When the camera 30 photographs the chess board 50 a plurality of times, the image processing device 300 detects grid points of the respective chess board photographed images 50i, averages the grid points of the respective chess board photographed images 50i, and detects the grid points of the chess board photographed image 50i.

As is apparent from a comparison between FIGS. 5 and 6, the chess board photographed image 50i is distorted as compared with the chess board 50 due to distortion aberration and the like of the lens of the camera 30. In step S13, the image processing device 300 calculates a first conversion parameter for correcting the distortion due to the lens. Since the expression for calculating the first conversion parameter is known, the details of the expression for calculating the first conversion parameter will be omitted.

Figure 7:
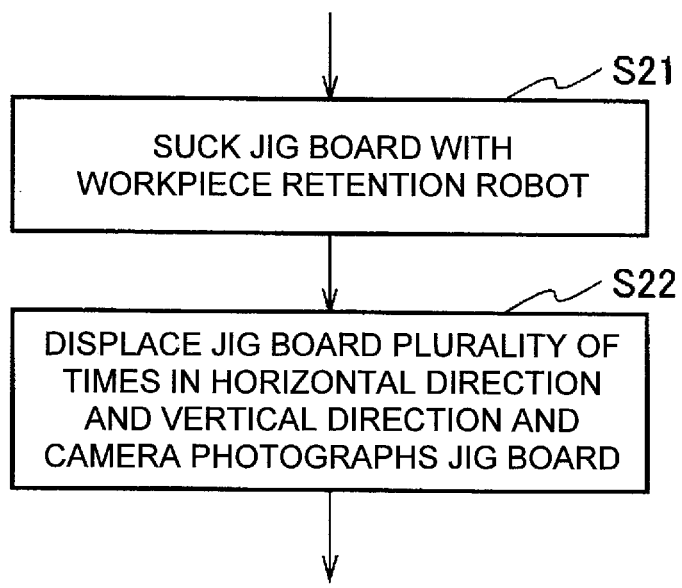
FIG. 7 is a flowchart showing specific processing of step S2 of FIG. 3.
Figure 8:
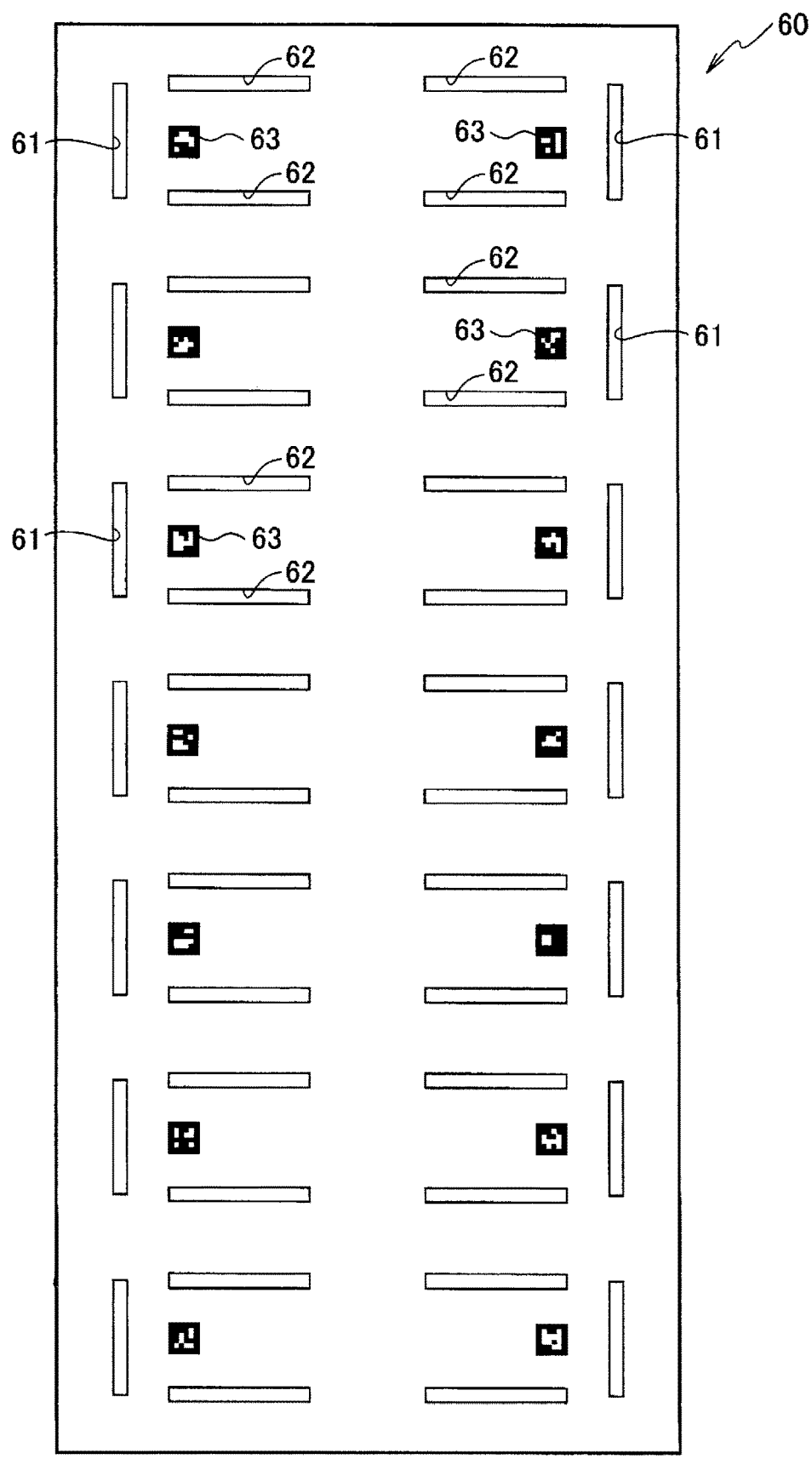
FIG. 8 is a plan view showing a jig board for calibration used in step S2 of FIG. 3.

FIG. 7 shows specific processing of step S2. In step S21 of FIG. 7, the robot control device 100 sucks a jig board 60 as shown in FIG. 8 with the workpiece retention robot 10. In step S22, the robot control device 100 displaces the jig board 60 above the pallet 20 a plurality of times in the horizontal direction and the vertical direction, and the camera 30 photographs the jig board 60 at each position.

The jig board 60 is made of a sheet metal. As shown in FIG. 8, on the jig board 60, a plurality of groove-shaped openings 61 parallel to the longitudinal direction and a plurality of groove-shaped openings 62 parallel to the lateral direction, which is the width direction, are formed. The two openings 62 are arranged at both end portions of each of the openings 61 at a predetermined distance from the opening 61. The direction of the opening 61 and the direction of the opening 62 are orthogonal to each other. An AR marker 63 is provided on the side of the opening 61 between the two openings 62. As an example, the AR marker 63 is provided by attaching a sticker of the AR marker to the sheet metal and fixing the sheet metal to the jig board 60 by way of screwing or the like. The AR marker is an example of a marker.

Figure 9:
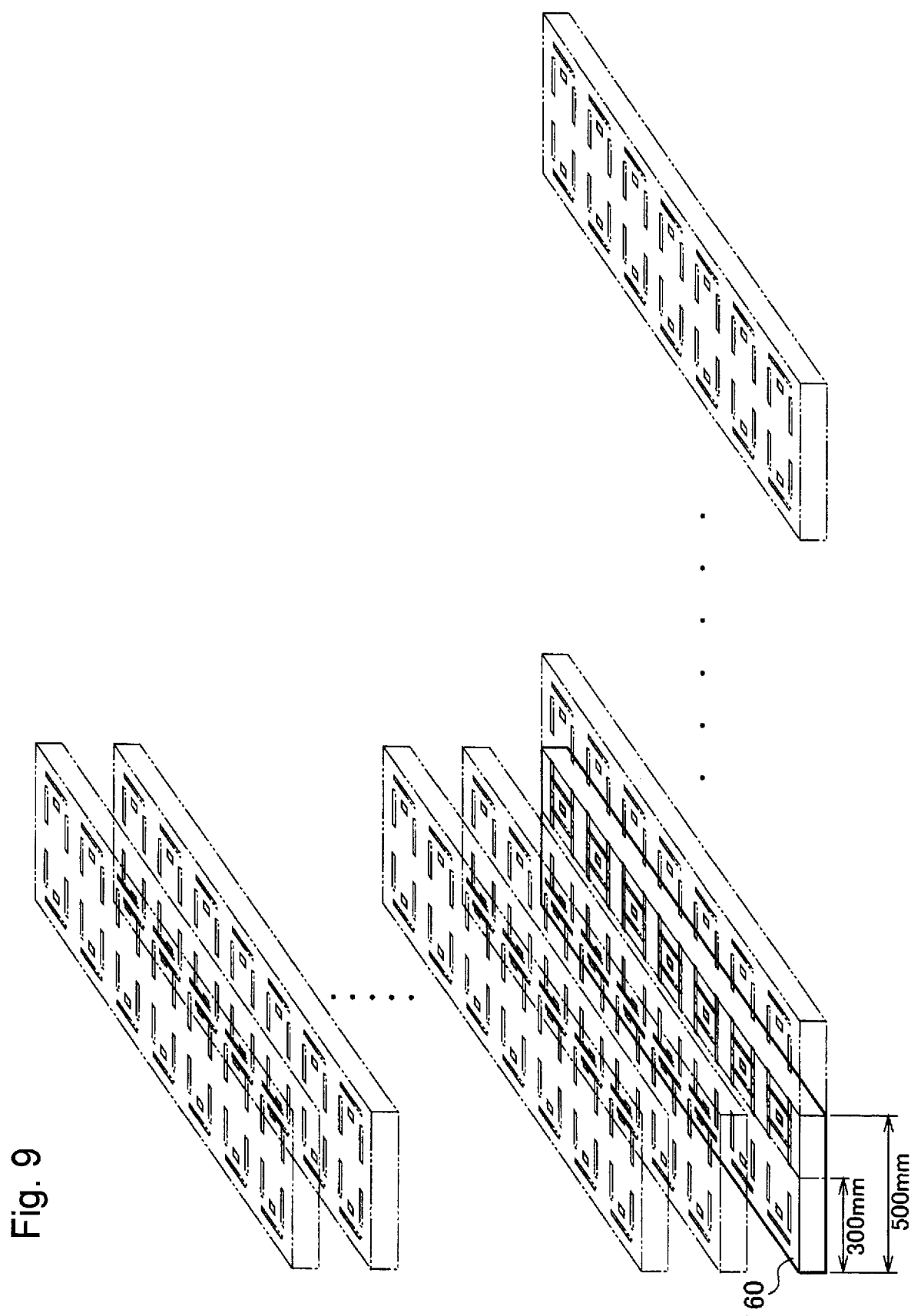
FIG. 9 is a conceptual diagram showing a state in which the jig board is displaced a plurality of times in the horizontal direction and the vertical direction.

As shown in FIG. 9, the width of the jig board 60 is 500 mm. As an example, the robot control device 100 displaces the jig board 60 by 300 mm in the horizontal direction after the camera 30 photographs the jig board 60. The robot control device 100 controls the workpiece retention robot 10 so as to displace the jig board 60 in the horizontal direction eight times from the position at which the jig board 60 is first placed, for example. The robot control device 100 displaces the jig board 60 in a direction connecting the lighting fixtures 22a and 22b in FIG. 1.

The robot control device 100 displaces the jig board 60 in the vertical direction nine times, for example, at each horizontal position. The camera 30 photographs the jig board 60 at each horizontal and vertical position. In other words, in one or more embodiments, the camera 30 photographs the jig board 60 at different positions in the horizontal or vertical position 90 times, and the photographed image data of the jig board 60 at each position is input to the image processing device 300.

The number of times the jig board 60 is displaced in the horizontal direction is arbitrary, and in some cases, the jig board 60 may not be displaced in the horizontal direction. The accuracy of the second and third conversion parameters, which will be described later, can be improved if the jig board 60 is displaced in the horizontal direction or if the number of times the jig board 60 is displaced is increased.

The jig board 60 is displaced in the vertical direction so as to detect the correspondence relation between the position of the jig board 60 in the vertical direction and the size of the photographed image. If the correspondence relation between the position in the height direction and the size is known, it is possible to detect at what height the uppermost workpiece W is when a plurality of the workpieces W are loaded on the pallet 20. If it is known at what height the uppermost workpiece W is, it is possible to reduce the suction error when the workpiece retention robot 10 sucks the uppermost workpiece W with the gripper 11. When it is not necessary to detect the position of the workpiece W in the height direction, the jig board 60 may not be displaced in the vertical direction.

Now, the chess board 50 shown in FIG. 5 that is used in the processing of step S1 may be provided on the back surface of the jig board 60. When the chess board 50 is provided on the back surface of the jig board 60, the jig board 60 may be sucked by the workpiece retention robot 10 before step S11 of FIG. 4 to turn over the jig board 60 so that the jig board 60 is photographed by the camera 30. After that, the jig board 60 may be turned face up to execute the processing of step S22 of FIG. 7.

Figure 10:
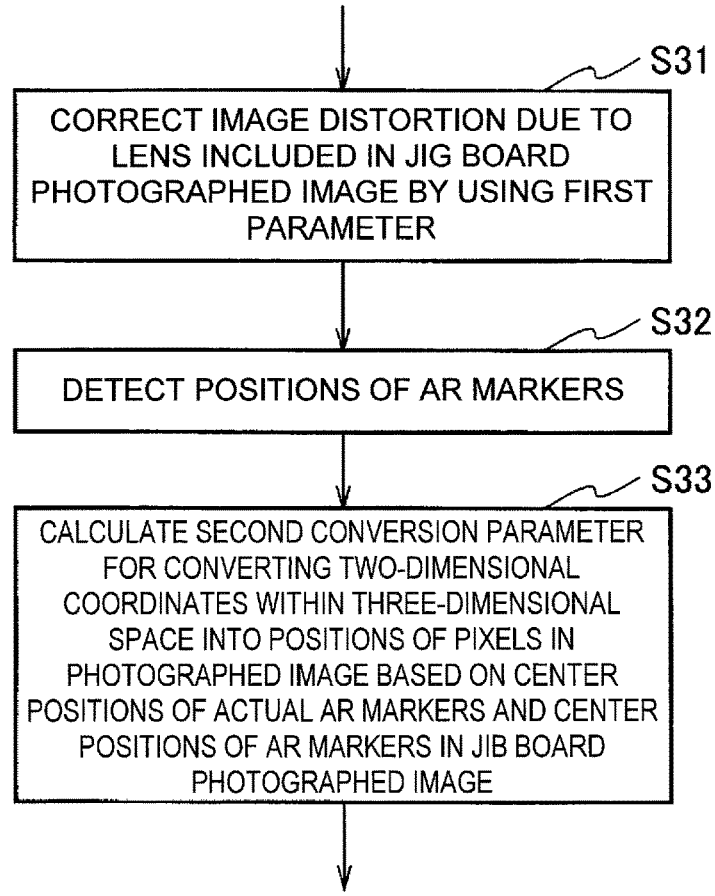
FIG. 10 is a flowchart showing specific processing of step S3 of FIG. 3.

FIG. 10 shows specific processing of step S3. In step S31 of FIG. 10, the image processing device 300 corrects, by using the first conversion parameter, the image distortion due to the lens that is included in the photographed image of the jig board 60. As a result, the distortion caused by the lens in the photographed image of the jig board 60 is removed. In step S32, the image processing device 300 detects the positions of the AR markers 63 in the photographed image.

The position at which the robot control device 100 has displaced the jig board 60 by controlling the workpiece retention robot 10 is known. In step S33, the image processing device 300 calculates a second conversion parameter based on the center points of the AR markers 63 on the actual jig board 60 and the center points of the AR markers 63 in the photographed image. The second conversion parameter is a conversion parameter for converting the two-dimensional coordinates in the three-dimensional space photographed by the camera 30 into the positions of the pixels in the photographed image.

The center point of the AR marker 63 is an example of a first reference point of the jig board 60. The first reference point may be set other than the AR marker 63.

Figure 11:
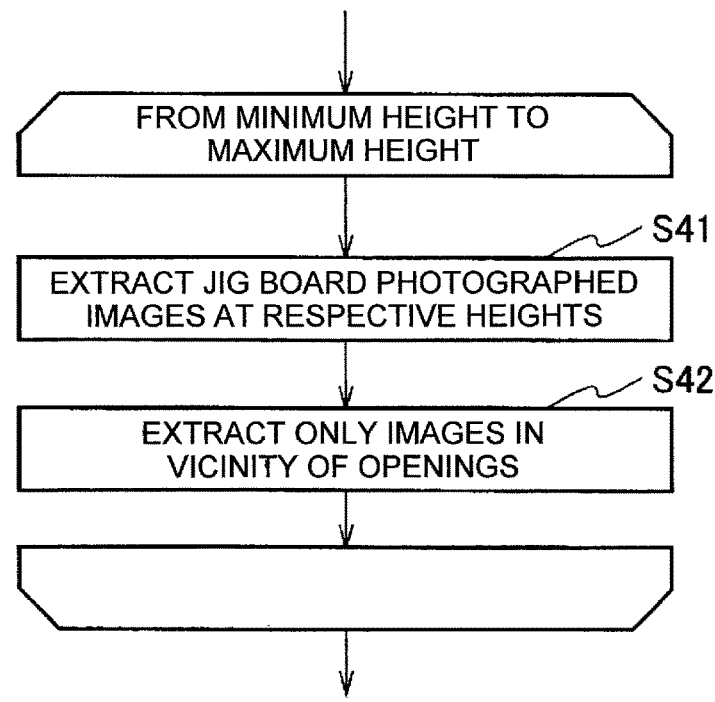
FIG. 11 is a flowchart showing specific processing of step S4 of FIG. 3.

FIG. 11 shows specific processing of step S4. In FIG. 11, the image processing device 300 repeats the processing of steps S41 and S42 from the minimum height to the maximum height. In step S41, the image processing device 300 extracts a photographed image of the jig board 60 at each height. In step S42, the image processing device 300 extracts only images in the vicinity of the openings 61 and 62.

Figure 12:
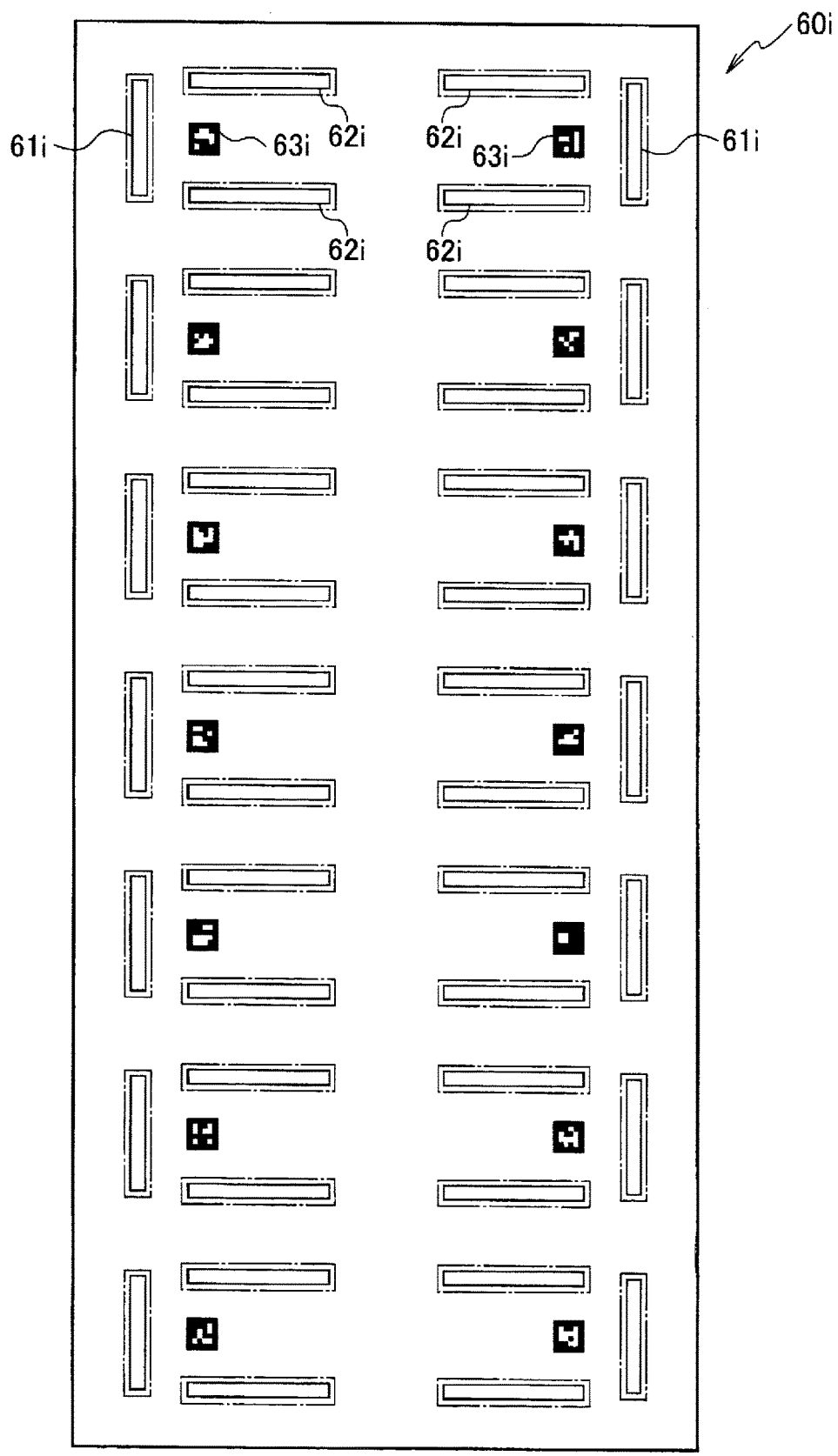
FIG. 12 is a diagram showing a state in which an only image in the vicinity of an opening of a jig board photographed image is extracted.

FIG. 12 shows a jig board photographed image 60i (a second photographed image) obtained by photographing the jig board 60. The jig board photographed image 60i includes opening edge images 61i and 62i of the openings 61 and 62, respectively, and marker images 63i of the AR markers 63. The image processing device 300 extracts images such that the opening edge images 61i and 62i are included as surrounded by the alternate long and short dash line. The positions of the openings 61 and 62 within the actual jig board 60 are known. The positions of the opening edge images 61i and 62i corresponding to the positions of the openings 61 and 62 can be obtained by using the second conversion parameter. Therefore, the image processing device 300 can extract images such that the opening edge images 61i and 62i are included.

Figure 13:
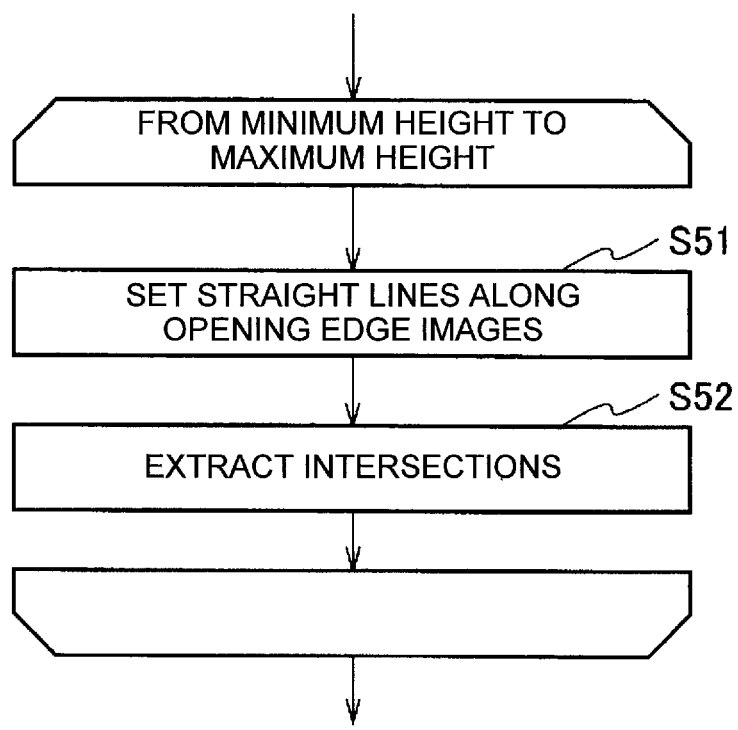
FIG. 13 is a flowchart showing specific processing of step S5 of FIG. 3.
Figure 14:
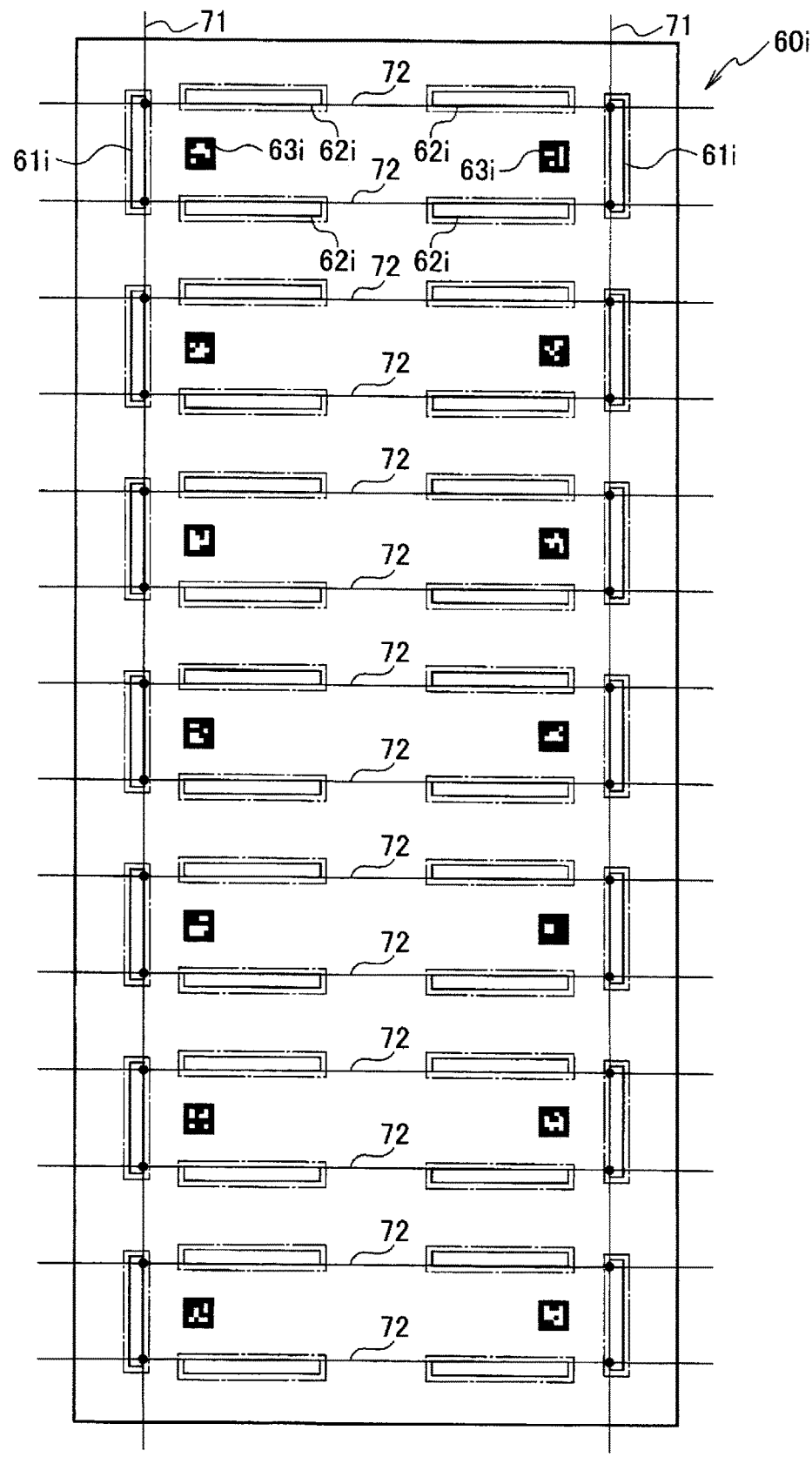
FIG. 14 is a diagram showing intersections formed by straight lines along opening edge images in the jig board photographed image.

FIG. 13 shows specific processing of step S5. In FIG. 13, the image processing device 300 repeats the processing of steps S51 and S52 from the minimum height to the maximum height. In step S51, the image processing device 300 sets straight lines along the opening edge images 61i and 62i of the jig board photographed image 60i at each height. As shown in FIG. 14, as an example, the image processing device 300 sets straight lines 71 along the sides of the opening edge images 61i facing the marker images 63i and straight lines 72 along the sides of the opening edge images 62i facing the marker images 63i. The straight lines 71 and 72 are orthogonal to each other.

Although only one jig board photographed image 60i is shown in FIG. 14, the straight lines 71 and 72 are set in the same manner in the jig board photographed images 60i at all positions displaced in the horizontal direction as shown in FIG. 9. The two straight lines 71 are set in the jig board photographed image 60i at each position in which the jig board 60 is displaced in the horizontal direction. The 14 straight lines 72 are connected in a straight line in the jig board photographed image 60i at each position in the horizontal direction.

Figure 15:
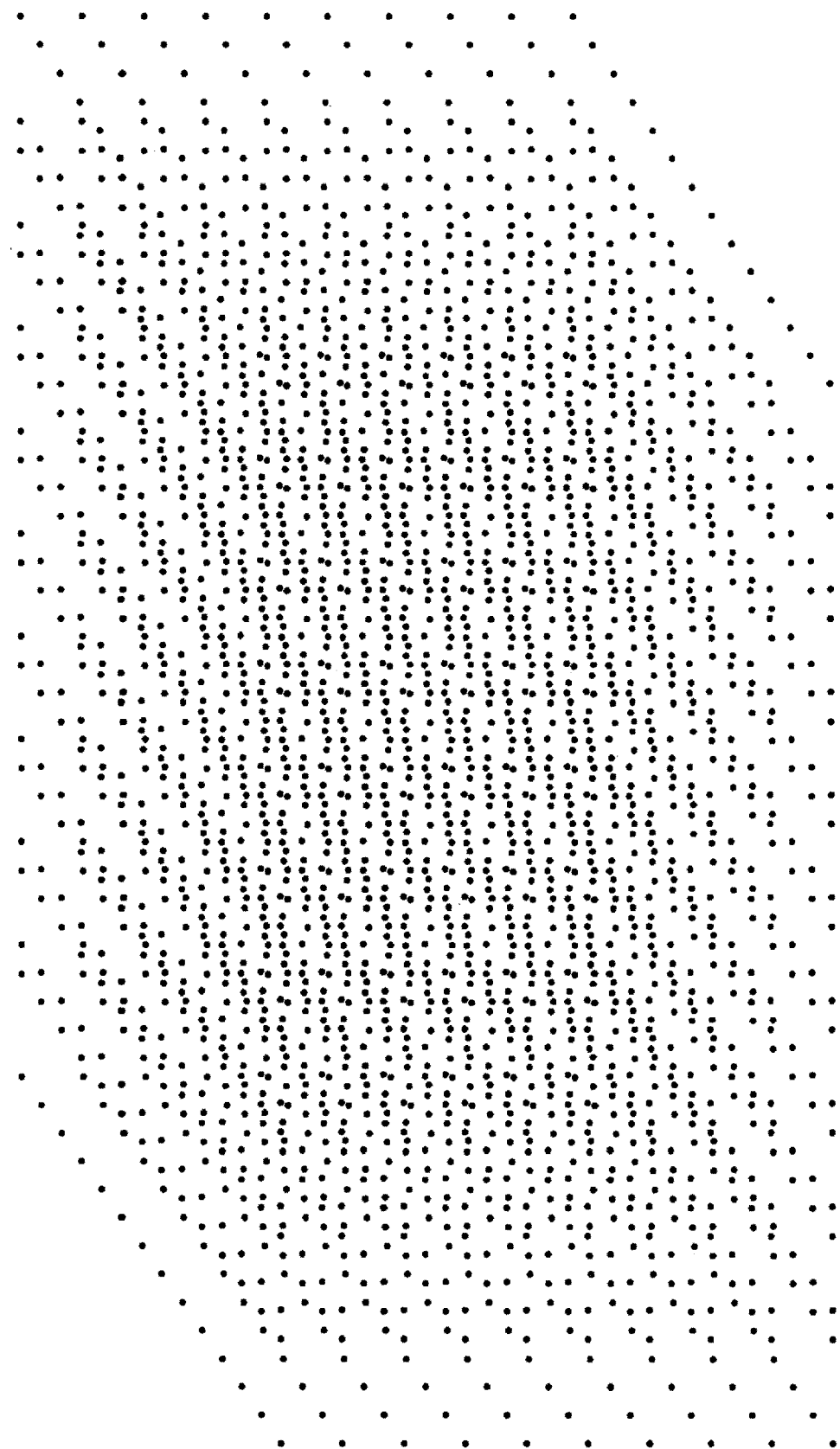
FIG. 15 is a diagram showing a group of intersections formed by the jig board photographed image when the jig board is displaced a plurality of times in the horizontal direction and the vertical direction.

Returning to FIG. 13, in step S52, the image processing device 300 extracts the intersections between the straight lines 71 and 72. The intersections between the straight lines 71 and 72 shown in FIG. 14 are indicated by black dots. FIG. 15 shows the intersections at all horizontal positions from the minimum height to the maximum height. A group of intersections shown in FIG. 15 is obtained by the processing shown in FIG. 13. The higher the vertical position of the jig board 60 is, the larger the jig board photographed image 60i is. Therefore, in reality, the group of intersections at one horizontal position shown in FIG. 15 is in a state in which an interval is slightly wider as the vertical position is higher.

The intersections between the straight lines 71 and 72 is an example of the second reference points of the jig board 60. More straight lines may be set in the jig board photographed image 60i to increase the number of the intersections as the second reference points. The second reference point may be set other than the intersection between the straight lines.

Figure 16:
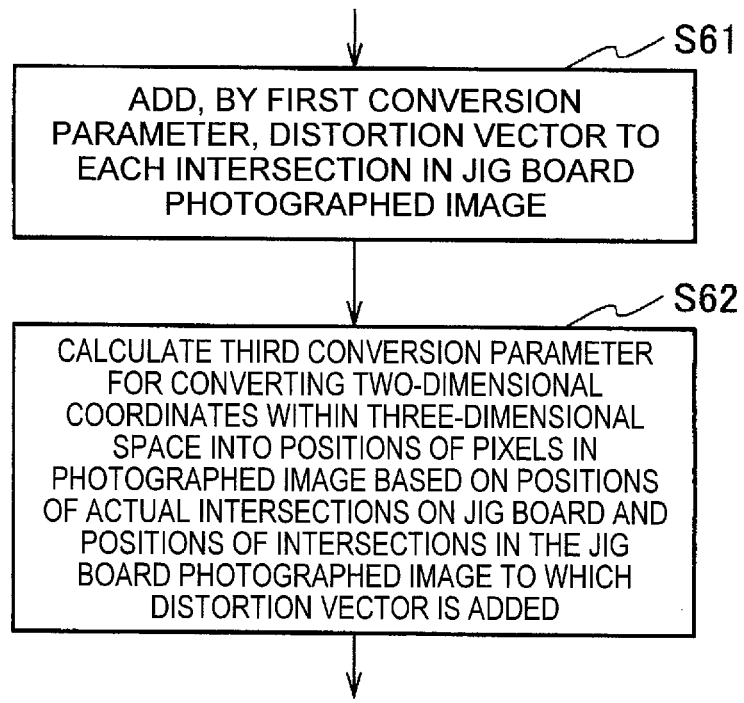
FIG. 16 is a flowchart showing specific processing of step S6 of FIG. 3.

FIG. 16 shows specific processing of step S6. In step S61 of FIG. 16, the image processing device 300 adds a distortion vector to each intersection in the jig board photographed image 60i by the first conversion parameter. As a result, the group of intersections shown in FIG. 15 is converted into a state in which the distortion vector of the lens of the camera 30 is added. In step S62, the image processing device 300 calculates a third conversion parameter based on the positions of the actual intersections of the jig board 60 and the positions of the intersections of the jig board photographed image 60i to which the distortion vector is added. The third conversion parameter is a conversion parameter for converting the two-dimensional coordinates in the three-dimensional space photographed by the camera 30 into the positions of the pixels in the photographed image. The third conversion parameter is more accurate than the second conversion parameter.

Figure 17:
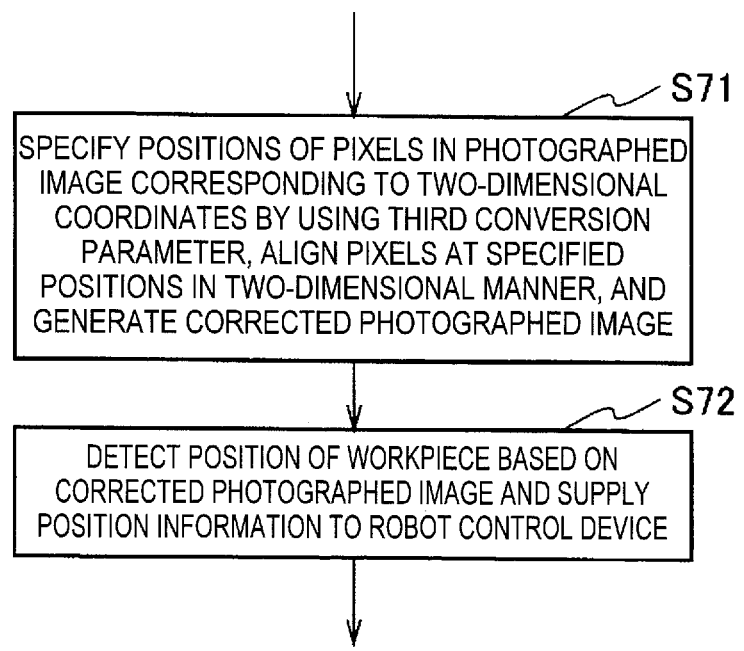
FIG. 17 is a flowchart showing specific processing of step S7 of FIG. 3.

FIG. 17 shows specific processing of step S7. In order to detect the position of the workpiece W placed on the pallet 20, the camera 30 photographs the pallet 20 on which the workpiece W is placed. Photographed image data (a third photographed image) generated by the camera 30 is supplied to the image processing device 300.

In step S71 of FIG. 17, the image processing device 300 specifies, by using the third conversion parameter, the positions of the pixels in the photographed image corresponding to the two-dimensional coordinates and align the pixels at the specified positions in the image memory in a two-dimensional manner. As a result, a corrected photographed image (a fourth photographed image) in which the trapezoidal distortion is corrected is generated. In step S72, the image processing device 300 detects the position of the workpiece W based on the corrected photographed image, and supplies the position information of the workpiece W to the robot control device 100.

FIG. 18 conceptually shows the processing executed in step S7. In FIG. 18, (a) shows a three-dimensional space obtained by photographing, with the camera 30, the pallet 20 on which the plurality of workpieces W are loaded. Coordinates X, Y, Z are defined as shown in the figure. In FIG. 18, (b) is a photographed image including the trapezoidal distortion due to the camera 30. The position at which the two-dimensional coordinates X and Y in the three-dimensional space is (0,0) is assumed to be the corner of the pallet 20. The position of the pixels in the photographed image of (b) corresponding to the coordinates X, Y=(0,0) of (a) is specified by the third conversion parameter. The pixels at the specified positions in the photographed image of (b) are aligned in a two-dimensional manner as shown in (c).

The image processing device 300 sequentially increases the coordinate X at the coordinate Y=0, specifies the position of the pixels in the photographed image corresponding to each coordinate up to the maximum value of X, and aligns the pixels at the specified positions in a two-dimensional manner. The image processing device 300 repeats the same operation at the coordinate Y=1 and thereafter. At this time, the image processing device 300 may interpolate pixels to align the pixels in a two-dimensional manner. By doing so, the distorted photographed image shown in (b) of FIG. 18 is converted into a two-dimensional image in which the trapezoidal distortion is removed as shown in (c).

Figure 19:
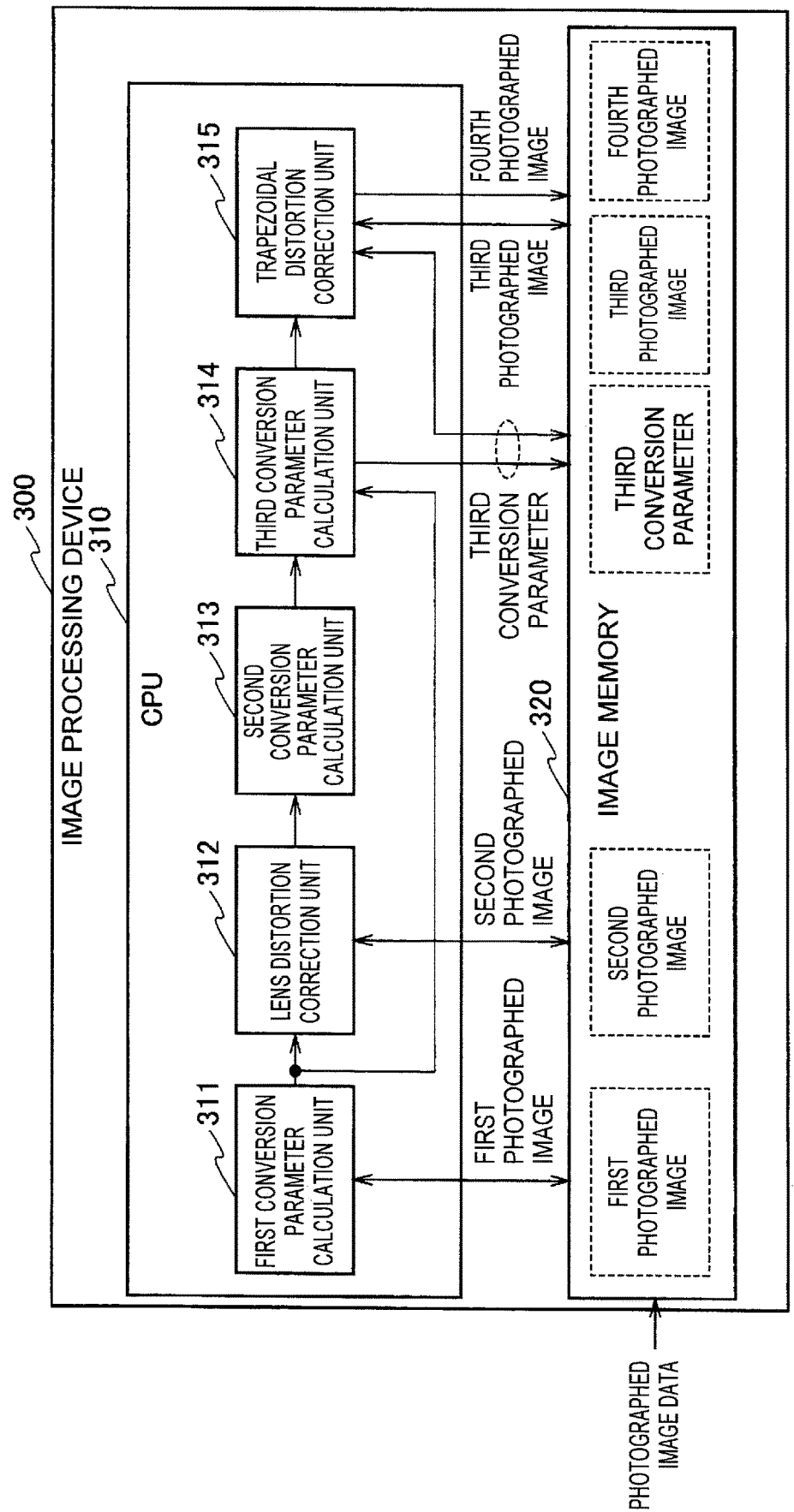
FIG. 19 is a block diagram showing a workpiece photographed image processing device according to one or more embodiments.

By configuring the image processing device 300 as shown in FIG. 19, the processing shown in FIG. 3 can be executed. The image processing device 300 is provided with a central processing unit (CPU) 310 and an image memory 320. The CPU 310 is provided with a first conversion parameter calculation unit 311, a lens distortion correction unit 312, a second conversion parameter calculation unit 313, a third conversion parameter calculation unit 314, and a trapezoidal distortion correction unit 315 as functional components.

When the camera 30 photographs a lattice pattern like the chess board 50, the chess board photographed image 50i (the first photographed image) is stored in the image memory 320. The first conversion parameter calculation unit 311 calculates, based on the chess board photographed image 50i, the first conversion parameter for correcting the image distortion due to the lens of the camera 30. The first conversion parameter is supplied to the lens distortion correction unit 312 and the third conversion parameter calculation unit 314.

When the camera 30 photographs the jig board 60, the jig board photographed image 60i (the second photographed image) is stored in the image memory 320. The lens distortion correction unit 312 corrects, by using the first conversion parameter, the image distortion due to the lens included in the jig board photographed image 60i.

The second conversion parameter calculation unit 313 extracts a plurality of the first reference points of the jig board 60 within the jig board photographed image 60i in which the image distortion is corrected. As an example, the first reference point is the center point of the AR marker 63. The second conversion parameter calculation unit 313 calculates the second conversion parameter based on the actual first reference points of the jig board 60 and the extracted first reference points within the jig board photographed image 60i. The second conversion parameter is a conversion parameter for converting the two-dimensional coordinates within the three-dimensional space photographed by the camera 30 into the positions of the pixels within the jig board photographed image 60i.

The third conversion parameter calculation unit 314 extracts, by using the second conversion parameter, a region corresponding to an actual predetermined location of the jig board 60 within the jig board photographed image 60i in which the image distortion is corrected. Examples of the predetermined locations include the openings 61 and 62. The third conversion parameter calculation unit 314 extracts a plurality of the second reference points based on an image of the extracted region within the jig board photographed image 60i. As an example, the second reference points are the intersections between the straight lines along the openings 61 and 62.

The third conversion parameter calculation unit 314 adds, by using the first conversion parameter, the image distortion due to the lens to the second reference points. The third conversion parameter calculation unit 314 calculates the third conversion parameter based on the actual second reference points of the jig board 60 and the second reference points within the jig board photographed image 60i to which the image distortion due to the lens is added. The third conversion parameter is a conversion parameter for converting the two-dimensional coordinates into the positions of the pixels within the jig board photographed image 60i. The third conversion parameter is stored in the image memory 320.

When the pallet 20 on which the workpiece W is placed is photographed by the camera 30, the third photographed image is stored in the image memory 320. The trapezoidal distortion correction unit 315 specifies, by using the third conversion parameter, to which pixels in the third photographed image the two-dimensional coordinates within the three-dimensional space photographed by the camera 30 correspond. The trapezoidal distortion correction unit 315 aligns the specified pixels corresponding to the respective coordinates in a two-dimensional manner, generates the fourth photographed image in which the trapezoidal distortion in the third photographed image is corrected, and stores the fourth photographed image in the image memory 320.

Since the CPU 310 detects the position of the workpiece W based on the fourth photographed image, the position of the workpiece W placed on the pallet 20 can be correctly recognized. Since the position of the workpiece W placed on the pallet 20 is correctly recognized, the workpiece retention robot 10 can accurately retain the workpiece W under the control of the robot control device 100.

The present invention is not limited to the one or more embodiments described above, and various modifications can be made without departing from the gist of the present invention. The image processing device 300 may be configured such that the CPU 310 executes a computer program to correct the trapezoidal distortion as shown in FIG. 18. The image processing device 300 may be composed of hardware such as an integrated circuit, or may be composed of software including a computer program. Alternately, the image processing device 300 may be composed of a mixture of the both. The software and the hardware can be arbitrarily used.

The present application claims priority based on Japanese Patent Application No. 2019-191675 filed with the Japan Patent Office on Oct. 21, 2019, and all the disclosures thereof are incorporated herein by reference.

The invention claimed is:

1. A workpiece photographed image processing device, comprising:
    a first conversion parameter calculation unit configured to calculate, based on a first photographed image obtained by photographing a lattice pattern with a camera located at a position deviated from directly above a center of a placement location of a workpiece, a first conversion parameter for correcting an image distortion due to a lens of the camera;
    a lens distortion correction unit configured to correct, by using the first conversion parameter, the image distortion due to the lens included in a second photographed image obtained by photographing a jig board with the camera;
    a second conversion parameter calculation unit configured to extract a plurality of first reference points of the jig board within the second photographed image in which the image distortion is corrected by the lens distortion correction unit, and to calculate, based on actual first reference points of the jig board and the extracted plurality of first reference points within the second photographed image, a second parameter for converting two-dimensional coordinates within a three-dimensional space photographed by the camera into positions of pixels within the second photographed image;
    a third conversion parameter calculation unit configured to extract, by using the second parameter, a region corresponding to an actual predetermined region of the jig board within the second photographed image in which the image distortion is corrected by the lens distortion correction unit, to extract a plurality of second reference points based on an image of the extracted region within the second photographed image, to add, by using the first conversion parameter, the image distortion due to the lens to the extracted plurality of second reference points, and to calculate, based on actual second reference points of the jig board and the extracted plurality of second reference points within the second photographed image to which the image distortion due to the lens is added, a third conversion parameter for converting the two-dimensional coordinates within the three-dimensional space into the positions of the pixels within the second photographed image; and
    a trapezoidal distortion correction unit configured to specify, by using the third conversion parameter, to which pixels in a third photographed image the two-dimensional coordinates within the three-dimensional space photographed by the camera correspond when the third photographed image is generated by photographing, with the camera, the placement location at which the workpiece is placed, to align the specified pixels corresponding to respective coordinates in a two-dimensional manner, and to generate a fourth photographed image in which a trapezoidal distortion in the third photographed image is corrected.

2. The workpiece photographed image processing device according to claim 1, wherein
    a plurality of markers are provided on the jig board, and
    the second conversion parameter calculation unit is configured to extract center points of the plurality of markers as the extracted plurality of first reference points.

3. The workpiece photographed image processing device according to claim 1, wherein
    a plurality of openings are formed on the jig board,
    the second photographed image includes opening edge images corresponding to the plurality of openings, and the
    third conversion parameter calculation unit is configured to
    extract a region including the opening edge images within the second photographed image in which the image distortion is corrected, and
    extract intersections between straight lines along the opening edge images as the extracted plurality of second reference points.

4. A workpiece photographed image processing method, comprising:
    calculating, based on a first photographed image obtained by photographing a lattice pattern with a camera located at a position deviated from directly above a center of a placement location of a workpiece, a first conversion parameter for correcting an image distortion due to a lens of the camera;
    correcting, by using the first conversion parameter, the image distortion due to the lens included in a second photographed image obtained by photographing a jig board with the camera;
    extracting a plurality of first reference points of the jig board within the second photographed image in which the image distortion is corrected;

calculating, based on actual first reference points of the jig board and the extracted plurality of first reference points within the second photographed image, a second parameter for converting two-dimensional coordinates within a three-dimensional space photographed by the camera into positions of pixels within the second photographed image;

extracting, by using the second parameter, a region corresponding to an actual predetermined region of the jig board within the second photographed image in which the image distortion is corrected;

extracting a plurality of second reference points based on an image of the extracted region within the second photographed image;

adding, by using the first conversion parameter, the image distortion due to the lens to the extracted plurality of second reference points;

calculating, based on actual second reference points of the jig board and the extracted plurality of second reference points within the second photographed image to which the image distortion due to the lens is added, a third conversion parameter for converting the two-dimensional coordinates within the three-dimensional space into the positions of the pixels within the second photographed image; and specifying, by using the third conversion parameter, to which pixels in a third photographed image the two-dimensional coordinates within the three-dimensional space photographed by the camera correspond when the third photographed image is generated by photographing, with the camera, the placement location at which the workpiece is placed, aligning the specified pixels corresponding to respective coordinates in a two-dimensional manner, and generating a fourth photographed image in which a trapezoidal distortion in the third photographed image is corrected.

5. The workpiece photographed image processing method according to claim 4, wherein a plurality of markers are provided on the jig board, and the method further comprising extracting center points of the plurality of markers as the extracted plurality of first reference points.

6. The workpiece photographed image processing method according to claim 4, wherein a plurality of openings are formed on the jig board, the second photographed image includes opening edge images corresponding to the plurality of openings, and the method further comprising:

extracting a region including the opening edge images within the second photographed image in which the image distortion is corrected; and extracting intersections between straight lines along the opening edge images as the extracted plurality of second reference points.

* * * * *